Aug. 4, 1959  M. J. CHARLES  2,898,523
ELECTRICAL CIRCUIT UNIT AND MOUNTING MEANS THEREFOR
Filed Oct. 8, 1958
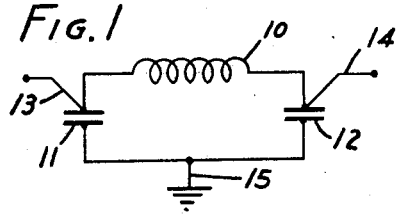
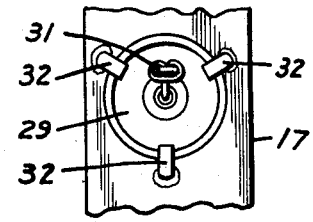
PRIOR ART
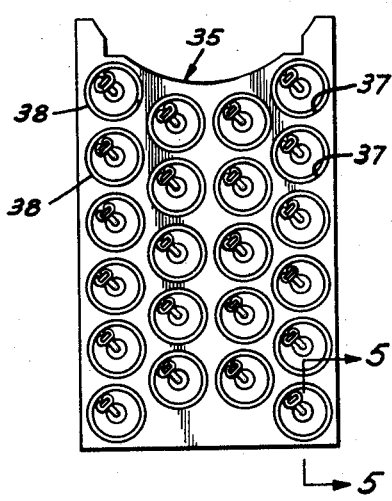
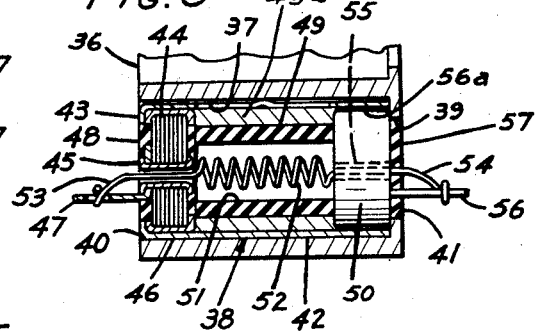
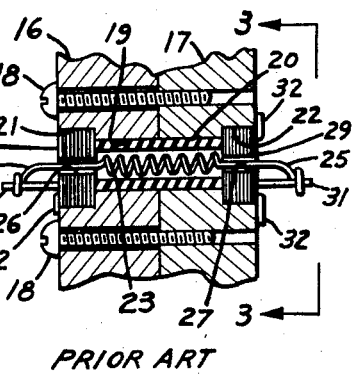
PRIOR ART
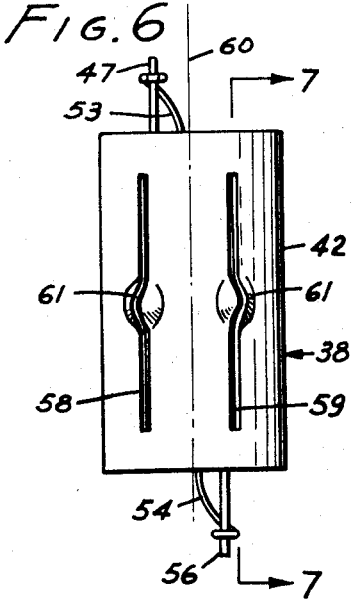
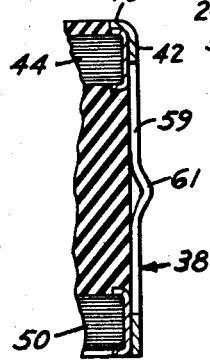
INVENTOR.
MALCOLM JEAN CHARLES
BY
ATTORNEYS United States Patent Office 2,898,523
Patented Aug. 4, 1959

2,898,523

ELECTRICAL CIRCUIT UNIT AND MOUNTING MEANS THEREFOR

Malcolm Jean Charles, Granada Hills, Calif., assignor to Carol Campbell Enterprises, Inc., North Hollywood, Calif., a corporation of California Application October 8, 1958, Serial No. 766,083

8 Claims. (Cl. 317—101)

This invention relates to an electrical circuit element and to means for assembling it as part of a "plug-in" assembly.

There are numerous examples of circuit elements, which elements comprise many independent electrical components, which are assembled in plates so as to be handled as a unit. One example is the block filter assembly for the ARN-21 Tacan Unit, designed by and built for the Bureau of Ships, United States Navy.

There are numerous problems inherent in manufacturing such assemblies, and serious problems have been encountered in servicing the same. For example, in previously known methods of assembling many associated circuit elements into a single structure, it has been common practice to assemble some components of each element in one plate and the remaining components in another plate, and then to align all of the elements and plates and bring them together. The problem here is that when there are as many as twenty or thirty sets of elements, getting all of the components aligned at the same time is a tricky and troublesome assembly technique. Even worse, due to the manner in which they are assembled, such assemblies are ordinarily quite unitary and are permanently assembled as by soldering or welding, so that if just a single one of the circuit components fails in service, it is necessary to scrap the entire assembly. This is unfortunate, because if there were provided means for replacing on a service basis only the circuit component which failed, the same device could quickly be restored to service at a considerable saving.

Accordingly, it is an object of this invention to provide a simple assembly technique and a construction achieved thereby in which the elements are individually removable and replaceable.

This invention is carried out in combination with a plate having a bore for each circuit element. Each bore is provided with an internal shoulder for positioning its respective element therein. The circuit element includes an outer tubular member which makes frictional contact with the wall of the bore, and the tubular member may conveniently be made one terminal of circuit elements contained therein if desired.

A preferred but optional feature of this invention resides in providing springing means in connection with the tubular member whereby the tubular member is maintained in firm compressive contact with the wall of the bore with which it is fitted.

The above and other features of this invention will be fully understood from the following detailed description and the accompanying drawings, in which:

Fig. 1 is a circuit diagram of a construction in accordance with the present invention;

Fig. 2 is a fragmentary cross-section of an attempt in the prior art to solve the present invention;

Fig. 3 is a view taken at line 3—3 of Fig. 2;

Fig. 4 is a plan view of an assembly according to the invention;

Fig. 5 is a fragmentary section taken at line 5—5 of Fig. 4;

Fig. 6 is an elevation of the circuit element shown in cross-section in Fig. 5; and Fig. 7 is a cross-section taken at line 7—7 of Fig. 6.

In the assembly for the block filter assembly for the ARN-21 Tacan Unit shown in Fig. 4, there are twenty-two circuit elements, each of which includes three electrical components. Previously, this device has been manufactured as shown in Figs. 2 and 3. According to this invention, it can be made as shown in Figs. 4-7.

In the aforesaid device it is desired to provide a circuit for each circuit element as shown in Fig. 1. As can be seen in that figure, each circuit includes a coil 10, a first capacitor 11 and a second capacitor 12. Each capacitor is provided with a tab 13, 14, respectively, each of which tabs acts as a terminal for the system. Both capacitors are grounded as at 15 in a manner to be further discussed. It will be seen that this circuit comprises two condensers, each of which has one of its plates connected at an end of the coil, the other plates of the condensers being connected to a common ground. Terminals are provided at the junction between the coils and one plate of each of the condensers.

The previous attempt to provide an assembly of many individual circuit elements of the type shown in Fig. 1, is particularly illustrated in Fig. 2. It is to be understood that Fig. 2 illustrates but one single installation of a circuit element, but it has been common practice to provide as many as twenty-two or more of these in a single assembly.

In Fig. 2 there is shown a pair of plates 16, 17 which are joined by screws 18, or other fasteners. Aligned bores 19, 20 are provided in plates 16 and 17, respectively, and each of these bores is counterbored, as at 21, 22, respectively. Within the bores 19 and 20 there is placed a coil 23, the coil having two terminal leads 24, 25. These terminal leads pass through central holes 26, 27 which are provided in the middle of a pair of "button" capacitors 28, 29. Capacitors 28 and 29 have usually been soldered into the counterbores, 21, 22, respectively.

The capacitors have tabs 30, 31, respectively, which provide terminals for each of them, and these tabs are respectively soldered or otherwise conductively connected to terminal leads 24, 25, respectively, of the coil.

The assembly technique for this prior art device has been quite complicated. Ordinarily, the capacitors have been installed in their respective counterbores, and one of the terminal leads has been led through the hole in one of the capacitors. Then, when this has been done at each bore, the other plate is brought down and it is attempted to line up all of the loose terminal leads so as to run them through the hole in the other capacitor. Thereafter, the plates are fastened together by the screws. Then, in order to make a proper contact between the capacitors and the plates, it has been necessary to provide ears 32 (see Fig. 3) which are integral with the case of the capacitor, and these ears have been turned down onto the plates and have been soldered thereto in order to make a reliable contact between the capacitors and the plates. Care has also had to be taken to join the two plates electrically so that they are both at the same potential.

It will be appreciated that this technique is quite tricky, and that once the device is put together, such as by soldering the terminal leads to the tab, and by soldering the ears to the plates, no one of the circuit elements can be removed without completely destroying the entire unitary assembly. It has therefore been customary, when any one of the capacitors or coils fail, to discard the entire assembly in the field. Often, the cost of factory rework is so large that the whole assembly is simply scrapped. This is an unnecessary economic penalty, and the present invention avoids it.

A further complication which tends to cause an entire assembly to be scrapped because of the failure of a single circuit element resides in the fact that the melting point of the solder used in the prior art structure was within a few degrees of the destruction temperature of the capacitors. As a consequence, scrap rates have been high in the assembly process, because such close temperature control was required. Field service operations are simply unable to exercise such close controls, so that the replacement of the entire assembly was the sole means of maintenance. Then, an attempt to disassemble the assembly usually resulted in still more destruction, so that in most cases it was simpler and cheaper to scrap the entire assembly, even though only one small component may have been faulty.

In Fig. 4 there is shown an assembly 35 according to the invention. This assembly, in contrast to the prior art, includes only a single mounting plate 36. This mounting plate is provided with a plurality of bores 37 therein. In the example shown, there are twenty-two of these bores, the example shown being the block filter assembly for the ARN-21 Tacan Unit. It will be understood that a circuit element 38 (particularly disclosed in detail in Figs. 5-7) is provided for in each one of these bores.

With particular reference to Fig. 5, it will be seen that bore 37, which passes all the way through the plate, has an interior shoulder 39. This leaves a large opening 40 at the left end, as shown in Fig. 5, and a reduced opening 41 at the right-hand side of the plate, as shown in Fig. 5.

The circuit element 38 is pressed into the bore until it abuts the interior shoulder 39.

A circuit element 38 includes a tubular member 42 which is made of some conductive metal, the tube being open at one end and having at the left-hand end, as seen in Fig. 5, an overhanging flange 43. A flange may be provided at the other end if desired, but need not be, and one is not dsiclosed in Fig. 5.

Starting from the left-hand end of Fig. 5 there is provided a first capacitor 44 of the familiar "button" type. A grommet 45 through the capacitor provides an opening through the capacitor. The capacitor has an outer case 46 which is electrically connected to one plate of the capacitor, and has a tab 47 which is connected to the other plate. This capacitor therefore has, as its two contacts, the case 46 and the tab 47. A layer 48 of potting material may be laid across the left-hand end of the circuit element after assembly is complete.

A soft insulating spacer 49, which is preferably a tubular cylinder, extends between the right-hand side of capacitor 44 and the left-hand side of capacitor 50. Spacer 49 fits within a tubular brass spacer 49a that abuts both capacitors to accurately space them. The insulating spacer has an opening 51 therethrough which accommodates a coil 52. Coil 52 has two terminal leads 53 and 54.

The second capacitor 50 is constructed the same as capacitor 44 and has an opening 55 therethrough. Terminal leads 53 and 54 pass through openings 51 and 55, respectively, and are attached outside the tubular member to tab 47 of the first capacitor and tab 56 of the second capacitor, respectively. A layer 57 of a potting material is laid over the right-hand face of capacitor 50. Tab 47 and terminal lead 53 project from the left-hand opening 40, and terminal lead 54 and tab 56 project through the reduced opening 41.

The capacitors can be bonded to the inside wall of the tubular member by solder 56a, if desired.

It is desired for the circuit element to make a tight frictional (compressive) fit with the wall of the bore 37. For this reason, the wall of the tubular member 42 is modified as best shown in Figs. 6 and 7. As shown in Fig. 6, a pair of slits 58, 59 are formed axially through the wall of the tubular member 42. These slits terminate short of the ends, and are preferably disposed around the central axis 60 of the tubular member at about 90° apart.

The wall of the tubular member is outwardly distorted so as to provide a dimension across the tubular member which is larger than the diameter of the bore in which the element is to be placed. This is conveniently accomplished by striking the inside wall of the tubular member (before the circuit element is assembled) with a peen, so as to form a protuberance or projection 61 on the outside of the tubular element. This projection preferably is centered on the slit and raises both sides thereof equally.

It will now be seen that the construction of the entire assembly 35 is one of simplicity. It is adapted to be constructed separately and independently of the construction of the entire assembly. After the plate is properly bored, to form shoulder 39, the circuit elements are pressed into their respective bores and because of the projections, the wall of the tubular member will make a tight, frictional fit, which constitutes a low resistance connection both at the points where the projections themselves contact the wall of the bores, and also at the opposite side of the tubular member where the member is forced tightly against the wall by compression of the projections.

It will be observed that the assembly technique is simply a matter of pressing the circuit elements into the appropriate bores, and that no further assembly techniques are required, such as joining plates or completing the circuit elements while the assembly is being made up.

In the event that there is a failure of one of the circuit elements 38, it is only necessary to take a pair of pliers and pull on tab 47. In the event this tab tears loose, then a hook can be inserted under the overhanging flange 43 to pull the circuit element out of the plate. The tab can ordinarily take the required tension, but in the event it may have become corroded, the flange 43 provides a "safety feature.

The construction of the tubular element is of some importance because it has been found that the forces exerted in holding the circuit element can be closely controlled. It has been found most desirable to dimple the wall out of the projections to make approximately a 0.010" increase in the diameter of a circuit element about $7/16''$ in diameter, wherein the tubular element is of 0.012" wall thickness, the tubular element being made of brass tubing. It has been found desirable to control the increase in diameter caused by the dimple to tolerances of $$+0.002''$$
$$-0.000''$$

in order to maintain a proper contact. The unit pressure of the protuberances is very high, and serves to maintain an effective electrical contact.

It will be observed that there is a considerable difference in assembly techniques between the prior art shown in Fig. 2 and the new device shown in Fig. 4. The contact between the circuit elements and the plate in the present invention is through a friction fit, while the old technique required a soldered tab. This is a considerable reduction in assembly costs and techniques, and the assembly is not rendered so unitary as to render its total rejection in the field on account of the failure of a single component. Individual circuit elements which are found to be defective may be removed and replaced individually right in the field, instead of requiring the entire complex arrangement to be removed and replaced (probably to be scrapped).

In the field, the faulty circuit element can be traced down and individually replaced in less than two minutes, and the old assembly, with a replacement element, reused. The saving is obvious.

This application is not to be limited to the embodiment shown in the drawings and described in the description, which is given by way of illustration and not of limitation, but only in accordance with the scope of the appended claims.

What is claimed is:

1. In combination: a plate having a bore therethrough, an interior shoulder in said bore; and a circuit element in said bore, said circuit element comprising a conductive tubular member, said tubular member having a central passage therethrough, a conductive coil in said passage, an insulating sleeve surrounding said coil within said passage, a terminal lead extending from each end of said coil, a pair of capacitors within said passage, each capacitor having a conductive case in contact with said tubular member, and having an opening therethrough, one of said capacitors being disposed on each side of said coil, one of said terminal leads passing through each of said openings, said capacitors each having a tab as one of its terminals and its case as the other of its terminals, each tab, and the terminal lead passing through its respective capacitor being conductively joined together; said tubular member being frictionally engaged in said bore, whereby one terminal of each of the capacitors is connected to the plate through the tubular member, and the plate thereby provides a common junction for said capacitors, and the projecting tabs provide another pair of terminals, one for each capacitor and one for each end of the coil.

2. Apparatus according to claim 1 in which the capacitors are bonded to the tubular member by a layer of conductive bonding material for reducing electrical resistance at that location.

3. Apparatus according to claim 1 in which an interior flange is provided on the tubular member within the passage and near an end thereof, said end being farther removed from the shoulder than the other end of the tubular member when the tubular member is placed in the bore.

4. Apparatus according to claim 1 in which the exterior of the tubular member is provided with springing means for making a firm compressive fit with said bore.

5. Apparatus according to claim 1 in which the tubular member is outwardly distorted, so that upon being forced into the bore the distorted shape is compressed so as to place the tubular member in firm compressive contact with said bore.

6. Apparatus according to claim 1 in which the tubular member has a central axis, and has a plurality of axial slits therethrough, there being an outwardly distorted portion of the tubular member at a medial point of each slit, said distorted portion being engaged by the wall of the bore and compressed when the tubular member is inserted in said bore so as to maintain the tubular member in a firm compressive contact with said bore.

7. Apparatus according to claim 6 in which there are two of said slits, said slits being spaced apart radially around the central axis by substantially 90°.

8. Apparatus according to claim 6 in which an interior flange is provided on the tubular member within the passage and near an end thereof, said end being farther removed from the shoulder than the other end of the tubular member when the tubular member is placed in the bore.

References Cited in the file of this patent
UNITED STATES PATENTS

| | | |
|---|---|---|
| 2,651,007 | Shepard | Sept. 1, 1953 |
| 2,759,155 | Hackenberg | Aug. 14, 1956 |
| 2,774,052 | Flour | Dec. 11, 1956 |